United States Patent [19]

Kondo et al.

[11] Patent Number: 4,622,278
[45] Date of Patent: Nov. 11, 1986

[54] ELECTROPHOTOGRAPHIC LIGHT-SENSITIVE MATERIAL COMPRISING CHARGE TRANSPORT COMPOUND AND STYRYL SENSITIZING DYE

[75] Inventors: Syunichi Kondo; Seiji Horie; Hideo Sato; Kenji Sano, all of Kanagawa, Japan

[73] Assignee: Fuji Photo Film Co., Ltd., Kanagawa, Japan

[21] Appl. No.: 697,981

[22] Filed: Feb. 4, 1985

[30] Foreign Application Priority Data

Feb. 3, 1984 [JP] Japan .................................. 59-19095

[51] Int. Cl.⁴ .............................................. G03G 5/06
[52] U.S. Cl. ....................................... 430/59; 430/74; 430/78
[58] Field of Search ...................... 430/73, 79, 74, 83, 430/81, 59

[56] References Cited

U.S. PATENT DOCUMENTS

| | | | |
|---|---|---|---|
| 3,246,983 | 4/1966 | Sus et al. | 430/73 |
| 4,042,388 | 8/1977 | Inoue et al. | 430/81 |
| 4,338,388 | 7/1982 | Sakai et al. | 430/79 |

*Primary Examiner*—John L. Goodrow
*Attorney, Agent, or Firm*—Sughrue, Mion, Zinn, Macpeak & Seas

[57] ABSTRACT

An electrophotographic light-sensitive material comprising a charge transporting compound and a styryl dye represented by formula (I)

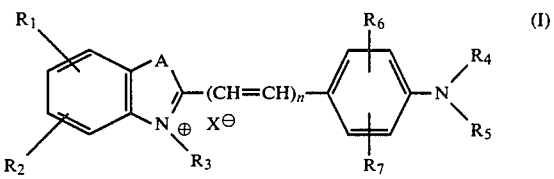

wherein
A represents $N-R_8$, O, S, Se, or

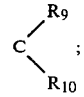

$R_1$ and $R_2$ each represents a hydrogen atom or a substituent having a Hammett's substituent constant, $\delta$, of 0.2 or more;

$R_3$, $R_6$, $R_7$, $R_8$, $R_9$, and $R_{10}$ each represents a hydrogen atom, an alkyl group or a substituted alkyl group containing from 1 to 5 carbon atoms in the alkyl moiety;

$R_4$ and $R_5$ each represents a hydrogen atom, an alkyl group, a substituted alkyl group, an aryl group, or a substituted aryl group;

$X^\ominus$ represents an anion; and n represents an integer of 1 or 2.

13 Claims, No Drawings

ELECTROPHOTOGRAPHIC LIGHT-SENSITIVE MATERIAL COMPRISING CHARGE TRANSPORT COMPOUND AND STYRYL SENSITIZING DYE

FIELD OF THE INVENTION

This invention relates to an electrophotographic light-sensitive material, and more particularly to a light-sensitive material for use in electrophotographic processes which comprises a conductive support having provided thereon a light-sensitive layer containing a charge transporting compound and a specific sensitizing dye.

BACKGROUND OF THE INVENTION

Photoconductive materials that have conventionally been used for light-sensitive materials for use in electrophotographic processes include inorganic substances such as selenium, cadmium sulfide, zinc oxide, etc. However, they require difficult procedures for being made into light-sensitive materials which leads to high production costs, and, in addition, they have no flexibility and cannot be used in a belt configuration. Further, they are susceptible to heat and mechanical shock, so that much care is required in handling them.

In recent years, electrophotographic light-sensitive materials using various organic substances have been proposed in order to overcome the defects of the inorganic substances, and some of them have been put into practice. For example, such materials include an electrophotographic light-sensitive material comprising poly-N-vinylcarbazole and 2,4,7-trinitrofluoren-9-one (U.S. Pat. No. 3,484,237), an electrophotographic light-sensitive material wherein poly-N-vinylcarbazole is sensitized with a pyrylium salt type dye (Japanese Patent Publication No. 25658/73 corresponding to U.S. Pat. No. 3,617,268), a light-sensitive material primarily comprising an organic pigment (Japanese Patent Application (OPI) No. 37543/72 corresponding to U.S. Pat. No. 3,898,084 (the term "OPI" as used herein refers to a "published unexamined Japanese patent application")), an electrophotographic light-sensitive material primarily comprising an eutectic crystal complex composed of a dye and a resin (Japanese Patent Application (OPI) No. 10785/72 corresponding to U.S. Pat. Nos. 3,732,180 and 3,684,502), etc.

These electrophotographic light-sensitive materials do not provide fully satisfactory sensitivity, though they do have higher flexibility and transparency than the light-sensitive materials of inorganic substances. Therefore, a highly sensitive electrophotographic light-sensitive material containing a pyrylium dye and a hydrazone compound has been proposed (Japanese Patent Application (OPI) No. 144833/83). However, this light-sensitive material is unsatisfactory in storage stability, and is further required to be improved with respect to light-sensitive wavelength region.

SUMMARY OF THE INVENTION

An object of the present invention is to provide an electrophotographic light-sensitive material having high flexibility and transparency.

Another object of the present invention is to provide an electrophotographic light-sensitive material having good storage stability and a desirable light-sensitive wavelength region.

These and other objects of the present invention will become apparent from the following description.

As a result of intensive investigations, the inventors have attained the above-described objects by an electrophotographic light-sensitive element comprising a charge transport compound and a styryl dye represented by formula (I)

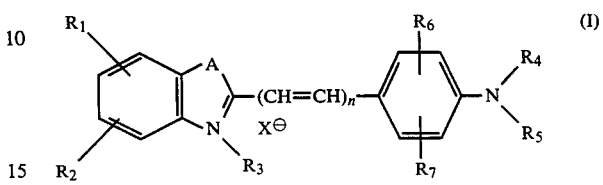

wherein
A represents N—$R_8$, O, S, Se, or

$R_1$ and $R_2$ each represents a hydrogen atom or a substituent having a Hammett $\delta$ value, of 0.2 or more;
$R_3$, $R_6$, $R_7$, $R_8$, $R_9$, and $R_{10}$ each represents a hydrogen atom, an alkyl group or a substituted alkyl group containing from 1 to 5 carbon atoms in the alkyl moiety;
$R_4$ and $R_5$ each represents a hydrogen atom, an alkyl group, a substituted alkyl group, an aryl group, or a substituted aryl group;
$X^\ominus$ represents an anion; and
n represents an integer of 1 or 2.

DETAILED DESCRIPTION OF THE INVENTION

The styryl dyes to be used in the present invention represented by the general formula (I) are described in more detail below.

$R_1$ and $R_2$ each represents a hydrogen atom or a substituent having a Hammett $\delta$ value, of 0.2 or more. The Hammett $\delta$ value, is described in L. P. Hammett, *Physical Organic Chemistry* (McGraw-Hill Book Co., N.Y.), p. 78 (1940); and in D. H. McDaniel and H. C. Brown, *J. Org. Chem.*, Vol. 23, p. 420 (1958). As $R_1$ and $R_2$, substituents having a constant of 0.2 or more are used. Specific examples thereof include a chlorine atom, a bromine atom, a nitro group, a cyano group, a trifluoromethyl group, a $CF_3O$ group, a $CH_3CO$ group, a $C_2H_5COO$ group, etc.

$R_3$, $R_6$, $R_7$, $R_8$, $R_9$, and $R_{10}$ each represents a hydrogen atom, an alkyl group or a substituted alkyl group containing from 1 to 5 carbon atoms in the alkyl moiety. As the substituent for the alkyl group, there are illustrated an alkyl group, an alkoxy group or aryloxy group, an aryl group, a cyano group, a nitro group, a chlorine atom, a bromine atom, etc.

$R_4$ and $R_5$ each represents a hydrogen atom, an alkyl group, a substituted alkyl group, an aryl group, or a substituted aryl group. As the alkyl group and the substituted alkyl group, there are illustrated alkyl groups preferably containing from 1 to 8 carbon atoms, and as the aryl group and the aryl moiety in the substituted aryl group, there are illustrated a phenyl group and a naphthyl group. As the substituents for the substituted alkyl or substituted aryl group, there are illustrated an alkyl group having 1 to 5 carbon atoms, an alkoxy group having 1 to 5 carbon atoms, an aryloxy group such as a phenoxy group, an aryl group such as a phenyl group, a cyano group, a nitro group, a chlorine atom, a bromine atom, etc.

$X^\ominus$ represents an anion, and specific examples thereof include $Cl^\ominus$, $Br^\ominus$, $I^\ominus$, $ClO_4^\ominus$, $BF_4^\ominus$, $ZnCl_3^\ominus$, $CF_3SO_3^\ominus$,

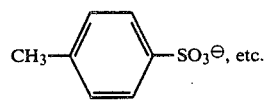

Specific examples of the styryl dyes of formula (I) that can be used in the present invention include the following dyes, which, however, does not limit the present invention in any way.

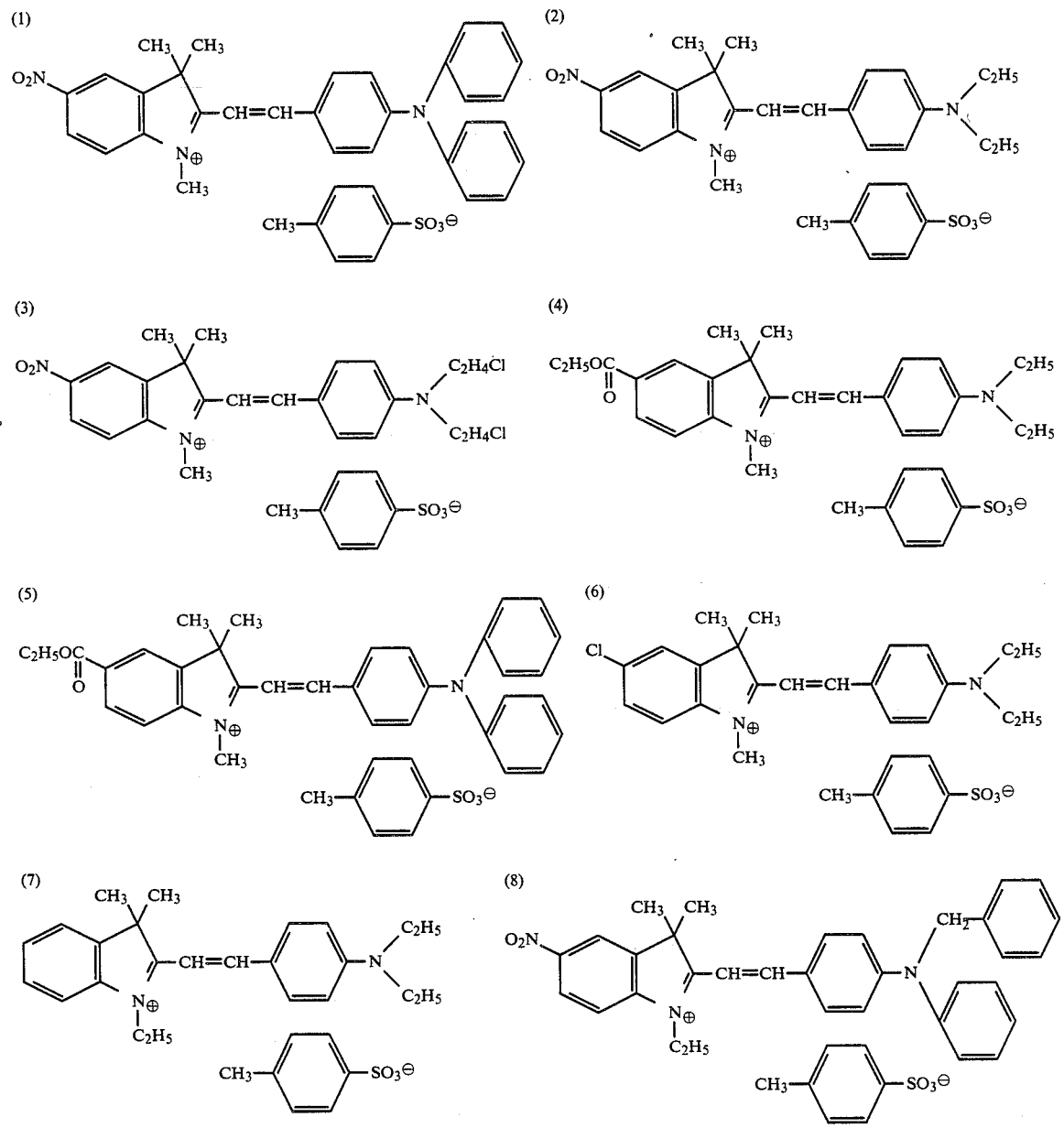

(9)
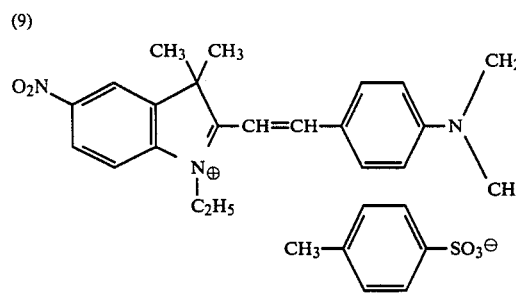
(10)
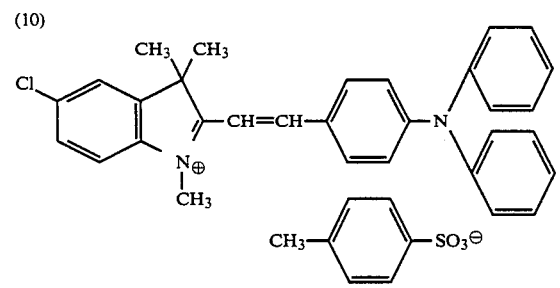
(11)
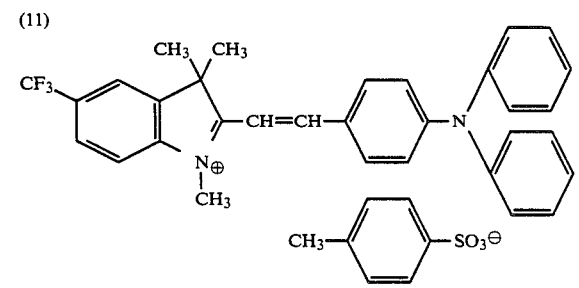
(12)
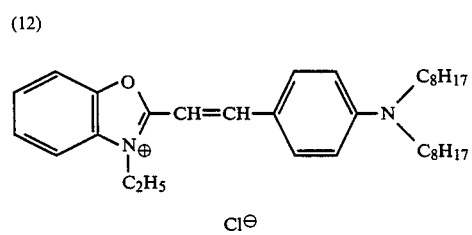
(13)
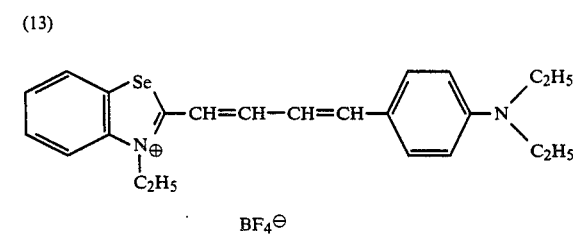
(14)
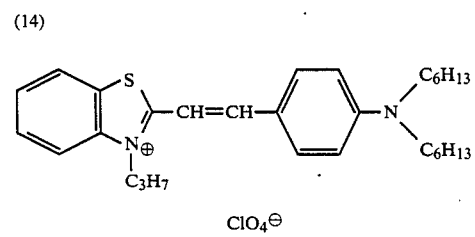
(15)
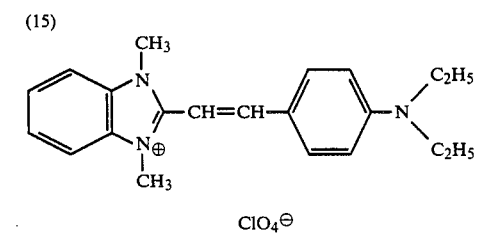
(16)
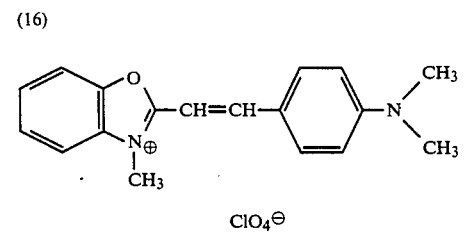
(17)
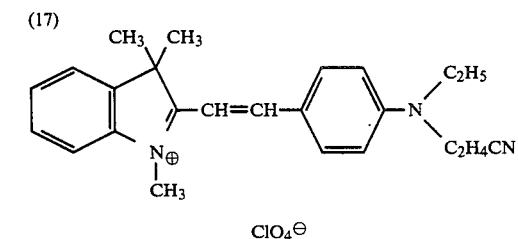
(18)
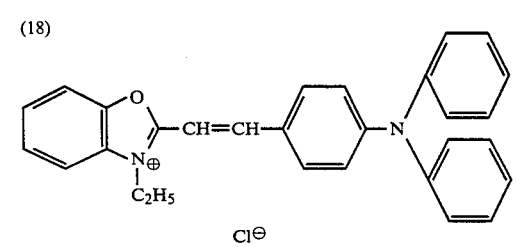
(19)
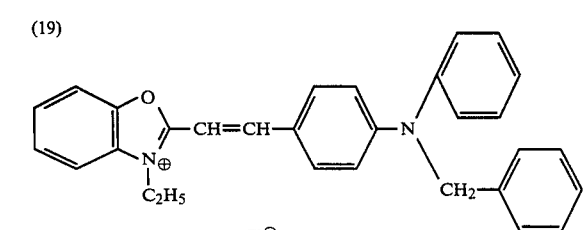

(20) 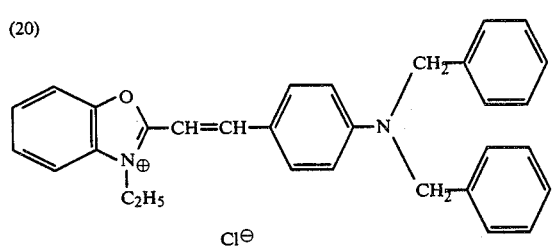
(21) 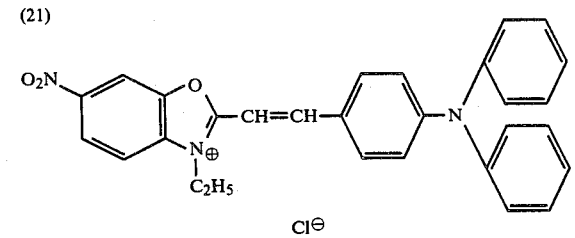
(22) 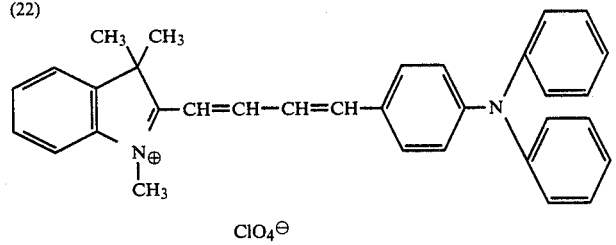
(23) 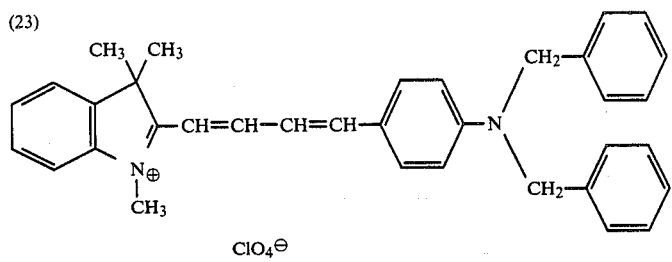
(24) 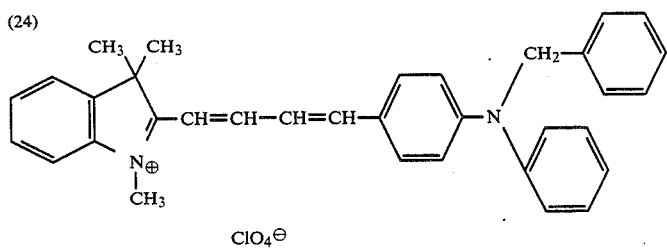
(25) 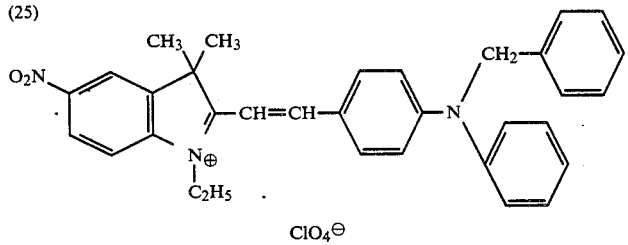
(26) 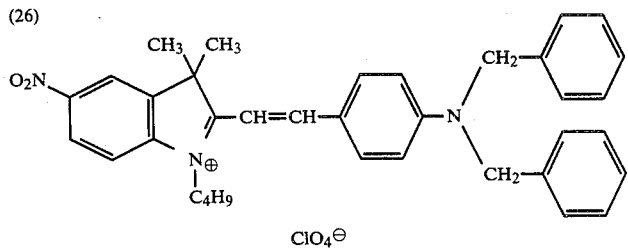

(27) 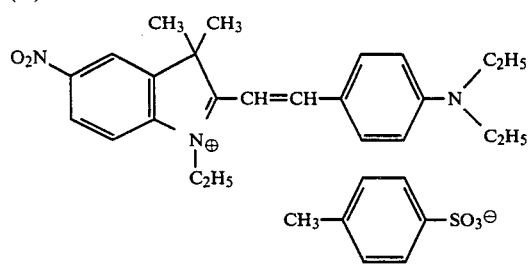
(28) 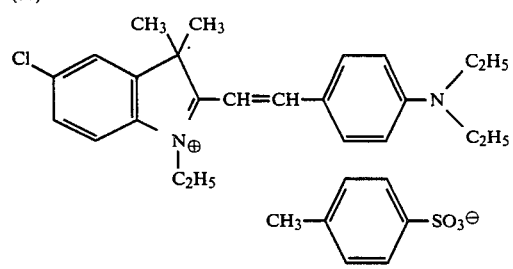
(29) 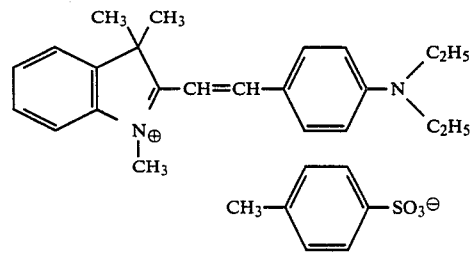
(30) 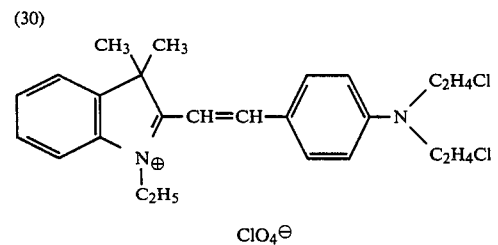
(31) 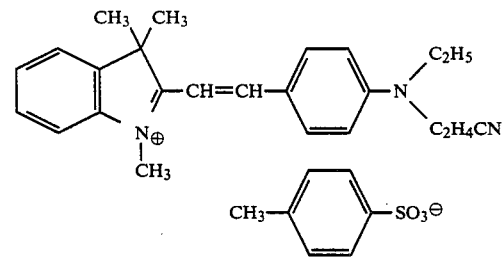
(32) 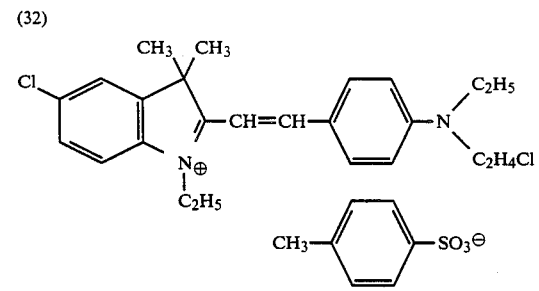
(33) 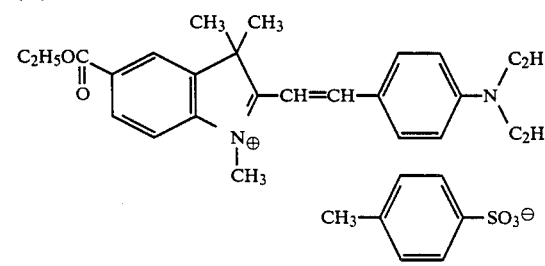
(34) 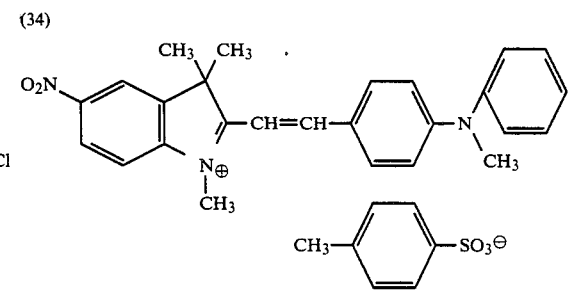
(35) 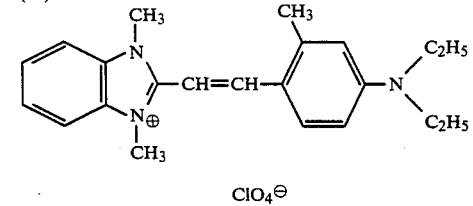
(36) 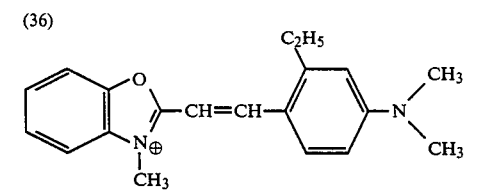
(37) 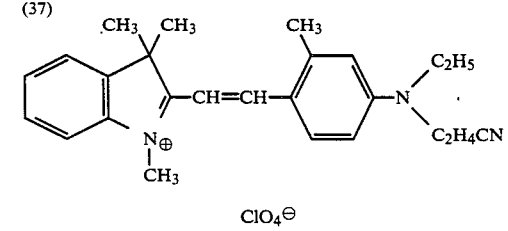
(38) 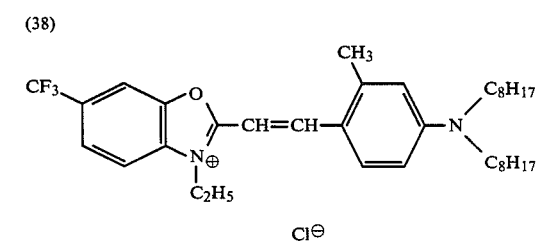

-continued

(39) 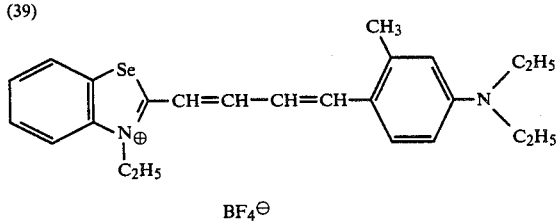

(40) 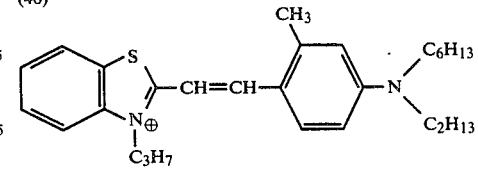

(41) 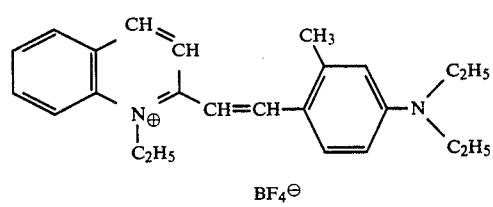

(42) 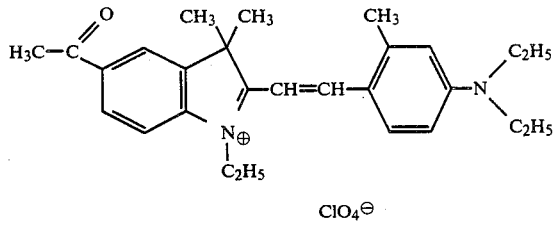

(43) 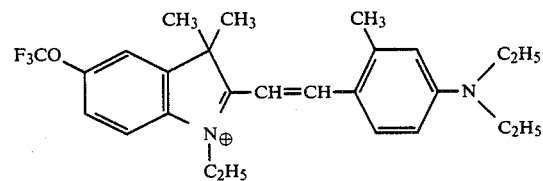

(44) 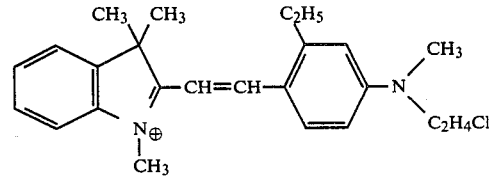

(45) 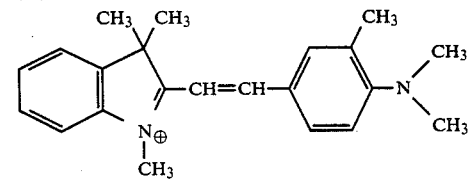

(46) 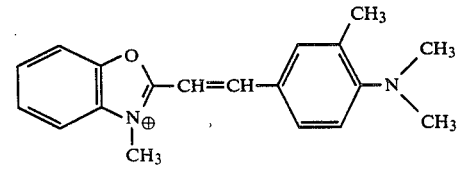

(47) 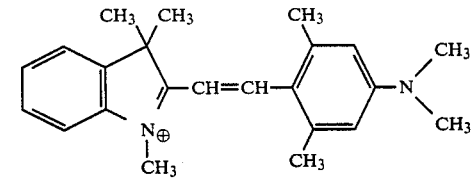

(48) 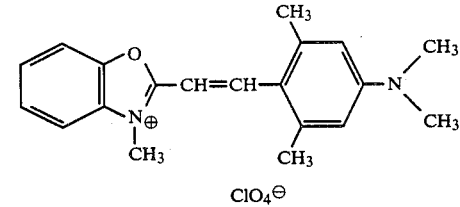

(49) 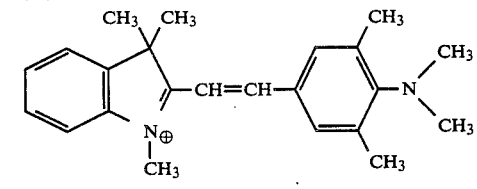

(50) 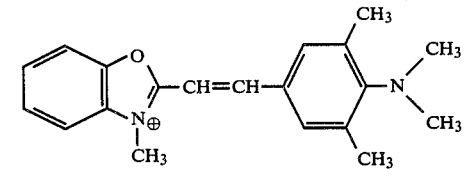

As the charge transporting compounds that can be used in the present invention, many compounds are known. For example, polymeric charge transport compounds include:

(1) polyvinylcarbazole and its derivatives as described in Japanese Patent Publication No. 10966/59;

(2) vinyl polymers such as polyvinylpyrene, polyvinylanthracene, poly-2-vinyl-4-(4'-dimethylaminophenyl)-5-phenyloxazole, poly-3-vinyl-N-ethylcarbazole, etc., as described in Japanese Patent Publication Nos. 18674/68 corresponding to U.S. Pat.

No. 3,232,755 and 19192/68 corresponding to U.S. Pat. No. 3,162,532;

(3) polymers such as polyacenaphylene, polyindene, acenaphthylene/styrene copolymer, etc., as described in Japanese Patent Publication No. 19193/68 corresponding to U.S. Pat. No. 3,169,060;

(4) condensed resins such as pyrene-formaldehyde resin, bromopyrene-formaldehyde resin, ethylcarbazole-formaldehyde resin, etc., as described in Japanese Patent Publication No. 13940/81 corresponding to U.S. Pat. Nos. 3,842,038 and 3,881,922; and (5) various triphenylmethane polymers as described in Japanese Patent Application (OPI) Nos. 90833/81 and 161550/81.

Low molecular weight charge transport compounds include:

(6) triazole derivatives as described in U.S. Pat. No. 3,112,197, etc.;

(7) Oxadiazole derivatives as described in U.S. Pat. No. 3,189,447, etc.;

(8) imidazole derivatives as described in Japanese Patent Publication No. 16096/62, etc.;

(9) Polyarylalkane derivatives as described in U.S. Pat. Nos. 3,615,402, 3,820,989, 3,542,544, Japanese Patent Publication Nos. 555/70 corresponding to U.S. Pat. No. 3,542,547, 10983/76 corresponding to U.S. Pat. No. 3,963,799, Japanese Patent Application (OPI) Nos. 93224/76 corresponding to U.S. Pat. No. 4,127,421, 17105/80, 4148/81, 108667/80, 156953/80, 36656/81, etc.

(10) pyrazoline derivatives and pyrazolone derivatives as described in U.S. Pat. Nos. 3,180,729 and 4,278,746, Japanese Patent Application (OPI) Nos. 88064/80, 88065/80, 105537/74 corresponding to U.S. Pat. No. 3,837,851, 51086/80, 80051/81, 88141/81, 45545/82, 112637/79, 74546/80, etc.;

(11) phenylenediamine derivatives as described in U.S. Pat. No. 3,615,404, Japanese Patent Publication No. 10105/76, Japanese Patent Application Nos. 83435/79, 110836/79, 119925/79, Japanese Patent Publication Nos. 3712/71 and 28336/72, etc.;

(12) arylamine derivatives as described in U.S. Pat. No. 3,567,450, Japanese Patent Publication No. 35702/74, West German Patent (DAS) No. 1,110,518, U.S. Pat. Nos. 3,180,703, 3,240,597, 3,658,520, 4,232,103, 4,175,961, 4,012,376, Japanese Patent Application (OPI) Nos. 144250/80, 119132/81, Japanese Patent Publication No. 27577/64, Japanese Patent Application (OPI) No. 22437/81, etc.;

(13) amino-substituted chalcone derivatives as described in U.S. Pat. No. 3,526,501;

(14) N,N-bicarbazyl derivatives as described in U.S. Pat. No. 3,542,546, etc.;

(15) oxazole derivatives as described in U.S. Pat. No. 3,257,203, etc.;

(16) styrylanthracene derivatives as described in Japanese Patent Application (OPI) No. 46234/81, etc.;

(17) fluorenone derivatives as described in Japanese Patent Application (OPI) No. 110837/79, etc.; and

(18) hydrazone derivatives as disclosed in U.S. Pat. No. 3,717,462, Japanese Patent Application (OPI) Nos. 59143/79 corresponding to U.S. Pat. No. 4,150,987, 52063/80 corresponding to U.S. Pat. No. 4,338,388, 52064/80, 46760/80, 11350/82, 148749/82, 64244/82, etc.

Of these, hydrazone compounds represented by formulae (II) and (III) are particularly preferable with respect to sensitivity, transparency, and coloration degree:

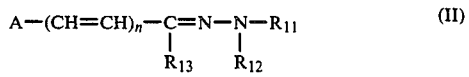

(II)

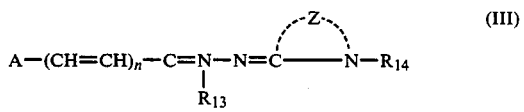

(III)

wherein
A represents:
- (a) an aryl group (e.g., a phenyl group, an α-naphthyl group, a β-naphthyl group, an anthranyl group, or a pyrenyl group),
- (b) a substituted aryl group (e.g., 4-dimethylaminophenyl group, a 4-diethylaminophenyl group, a 4-dipropylaminophenyl group, a 4-dibutylaminophenyl group, a 4-dibenzylaminophenyl group, a 4-diphenylaminophenyl group, a 4-methoxyphenyl group, a 2-methoxy-α-naphthyl group, a 4-methoxy-α-naphthyl group, a 2,4-dimethoxyphenyl group, a 2-ethoxy-4-diethylaminophenyl group, a 4-bromo-9-anthralyl group, or a 4-dimethylamino-9-anthralyl group),
- (c) a heterocyclic group (e.g., a monovalent heterocyclic group derived from, for example, dibenzofuran, carbazole, indole, thiophene, furan, pyrrole, pyrazole, acridine, xanthene, thioxanthene, phenothiazine, pyridine, phenoxazine, benzimidazole, thiazoline, thiazole, benzothiazole, naphthothiazole, oxazoline, oxazole, benzoxazole, naphthoxazole, 1,3,4-oxadiazole, 1,3,4-thiadiazole, triazole, quinoline or the like), or
- (d) a substituted heterocyclic group (e.g., heterocyclic group of above-described (c) substituted by one or more substituents such as an alkyl group (e.g., a methyl group, an ethyl group or a propyl group), a halogen atom (e.g., a chlorine atom or a bromine atom), an alkoxy group (e.g., a methoxy group, an ethoxy group or a propoxy group), an aryl group (e.g., a phenyl group, a tolyl group or a xylyl group), an aralkyl group (e.g., a benzyl group or a phenethyl group), a hydroxy group or a carboxy group, $R_{13}$ represents a hydrogen atom, an aryl group (e.g., a phenyl group, a naphthyl group, etc.), a substituted aryl group (e.g., a 4-dimethylaminophenyl group, a 4-diethylaminophenyl group, a 4-dipropylaminophenyl group, a 4-methoxyphenyl group, a 4-ethoxyphenyl group, a 2-methylphenyl group, a 2,4-dimethoxyphenyl group, etc.), an alkyl group (e.g., a methyl group, a propyl group, an isopropyl group, a butyl group, an isobutyl group, a t-butyl group, an amyl group, a t-amyl group, a hexyl group, a cyclohexyl group or an octyl group), a substituted alkyl group (e.g., a 2-hydroxyethyl group, a 3-hydroxypropyl group, a 2-methoxyethyl group, a 3-methoxypropyl group, a 2-cyanoethyl group, a 3-cyanopropyl group, a carboxymethyl group, a 2-carboxyethyl group, a 2-chloroethyl group, a 3-chloropropyl group, etc.), an aralkyl group (e.g., a benzyl group, a phenethyl group, a 3-phenylpropyl group, an α-naphthylmethyl group, a β-naphthylmethyl group, etc.) or a substituted aralkyl group (e.g., a methoxybenzyl group, an ethoxybenzyl group, a hydroxybenzyl group, a chlorobenzyl group, a bromobenzyl group, a methylbenzyl group, a dimethylbenzyl group, a dimethylaminobenzyl group, etc.), $R_{11}$, $R_{12}$, and $R_{14}$ each represents an alkyl group such as a methyl group, an ethyl group, a propyl group, a butyl group or an amyl group, an aryl group such as a phenyl group, a β-naphtyl group, an β-naphthyl group or the like, a substituted aryl group such as a tolyl group, a xylyl group, an ethylphenyl group, a methoxyphenyl group, an ethoxyphenyl group, a hydroxyphenyl group or the like, an aralkyl group such as a benzyl group or a phenethyl group, or a substituted aralkyl group such as a methoxybenzyl group, an ethoxybenzyl group, a hydroxybenzyl group, a methylbenzyl group or an ethylbenzyl group, n represents an integer of 0 or 1, and Z represents atoms forming a substituted or unsubstituted heterocyclic group (e.g., oxazole, benzoxazole, naphthoxazole, thiazole, benzothiazole, naphthothiazole, selenazole, benzoselenazole, naphthoselenazole, quinoline, pyridine, indole, etc.). Substituents thereof can include the same atoms or groups as the substituents on the substituted heterocyclic group of above-described (d).

Representative examples of the hydrazone compounds shown by the general formula (II) or (III) are listed below.

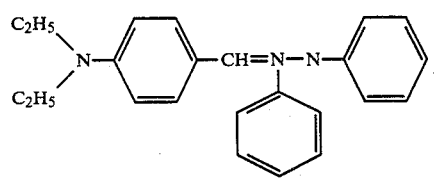
CT-(1)

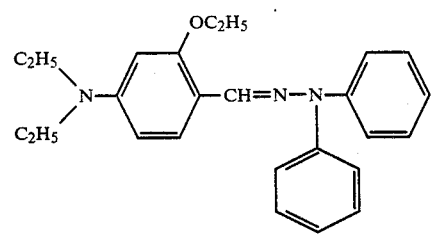
CT-(2)

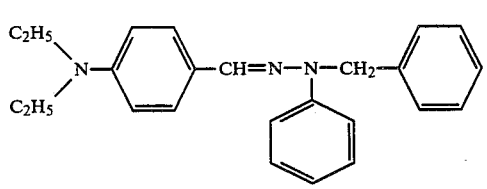
CT-(3)

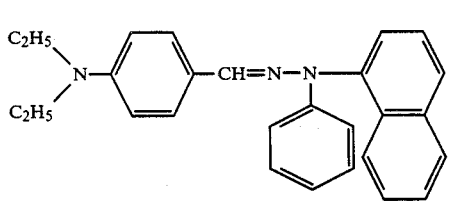
CT-(4)

CT-(5)

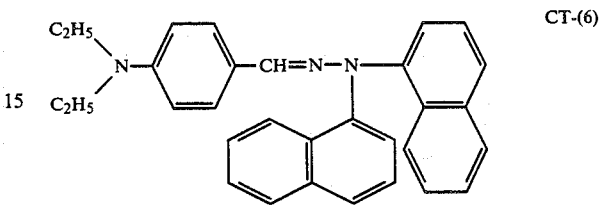
CT-(6)

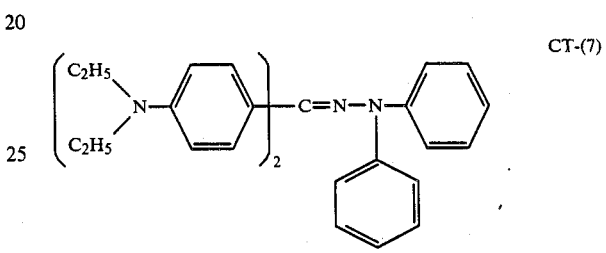
CT-(7)

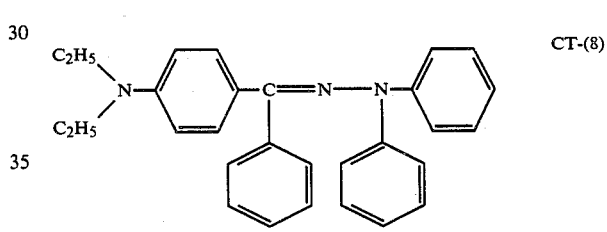
CT-(8)

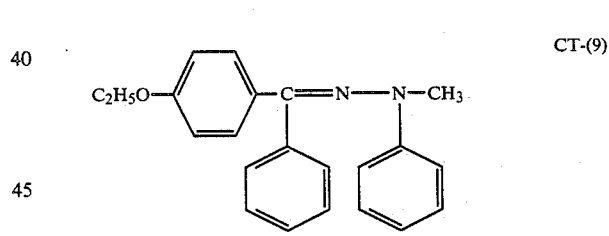
CT-(9)

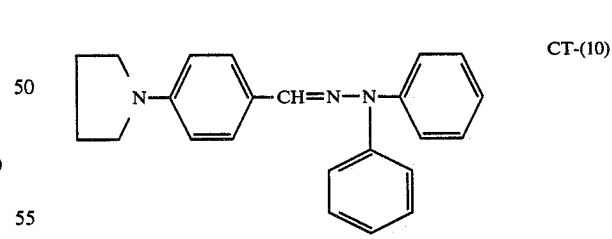
CT-(10)

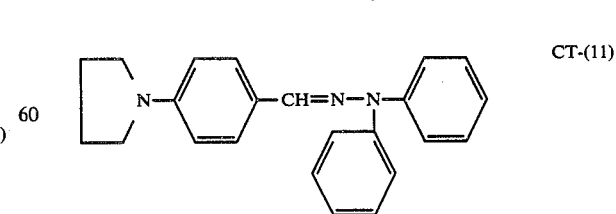
CT-(11)

-continued
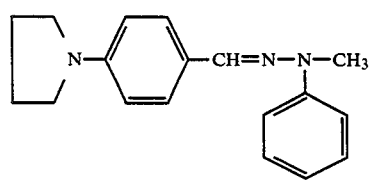 CT-(12)
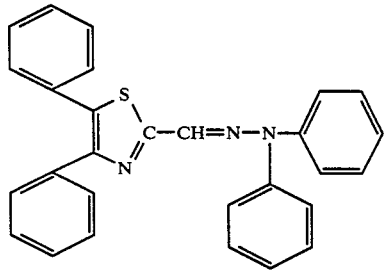 CT-(13)
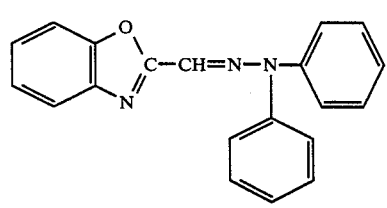 CT-(14)
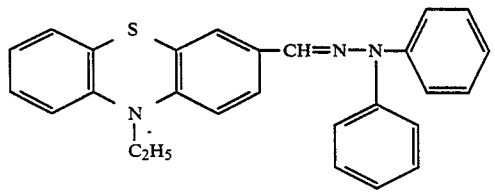 CT-(15)
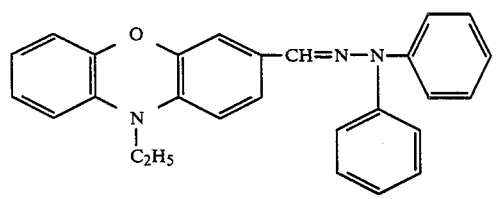 CT-(16)
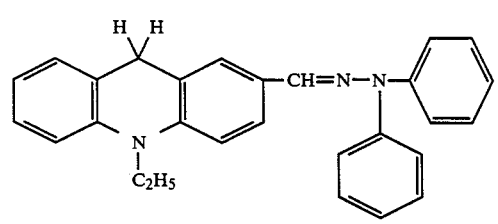 CT-(17)
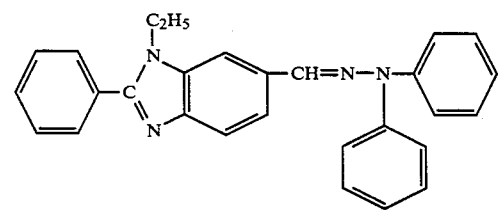 CT-(18)
-continued
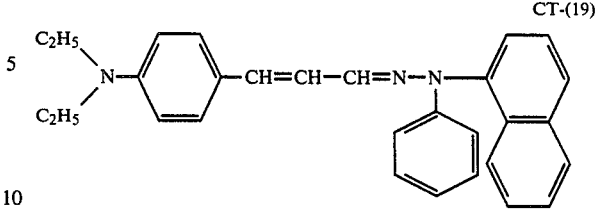 CT-(19)
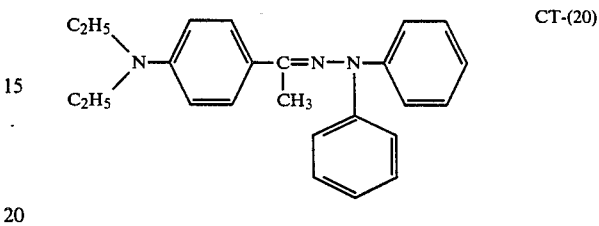 CT-(20)
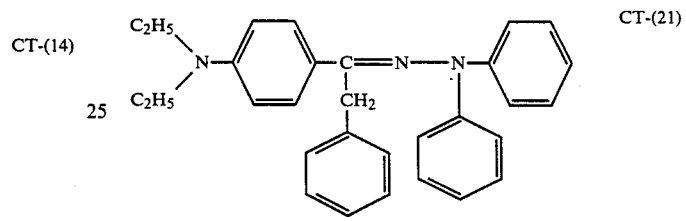 CT-(21)
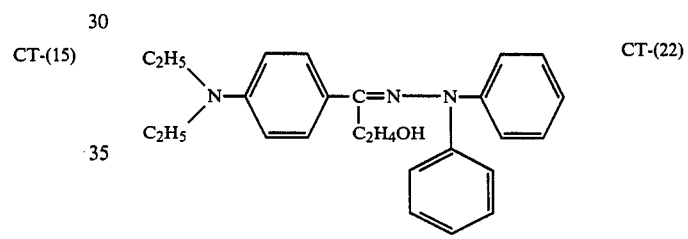 CT-(22)
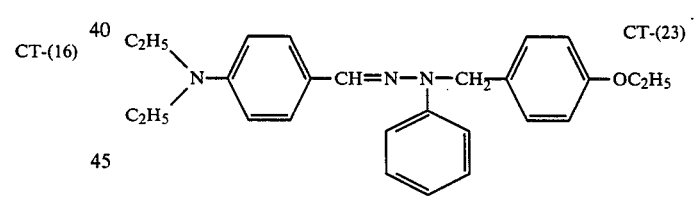 CT-(23)
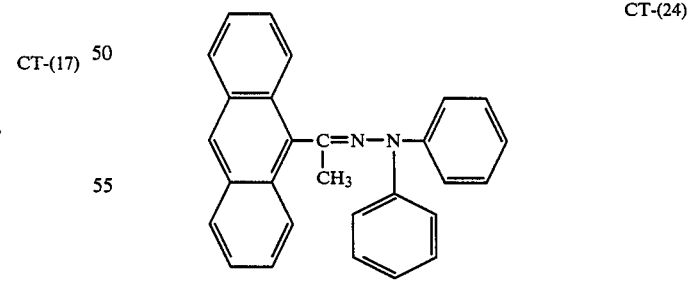 CT-(24)
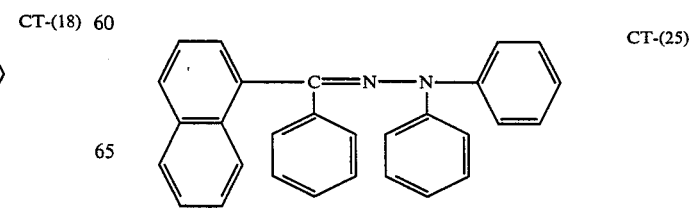 CT-(25)

-continued
CT-(26)
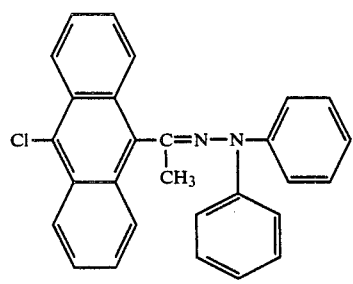
CT-(27)
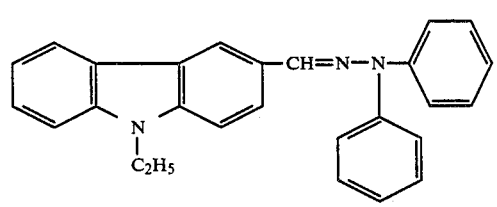
CT-(28)
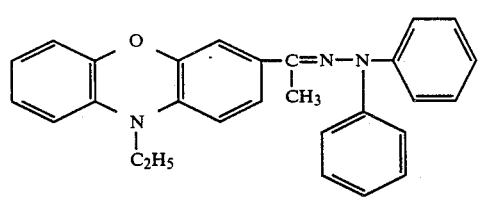
CT-(29)
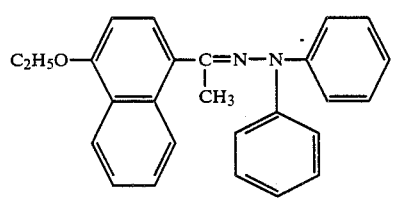
CT-(30)
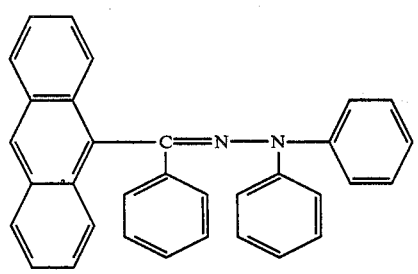
CT-(31)
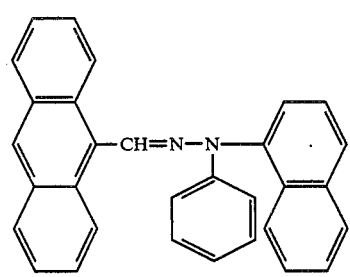
-continued
CT-(32)
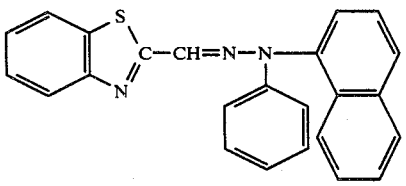
CT-(33)
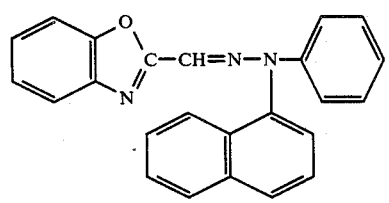
CT-(34)
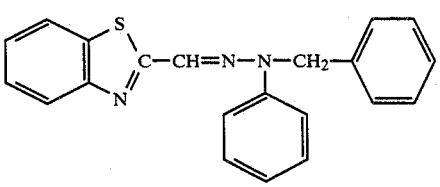
CT-(35)
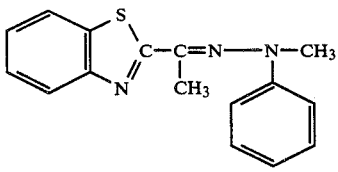
CT-(36)
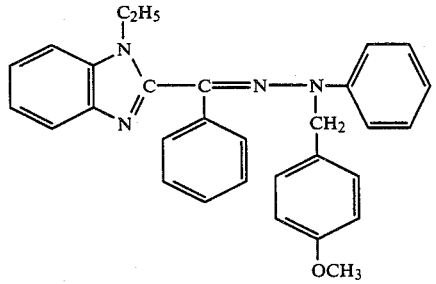
CT-(37)
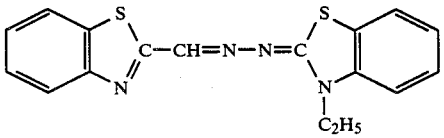
CT-(38)
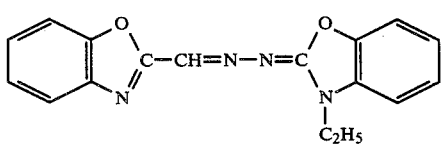
CT-(39)
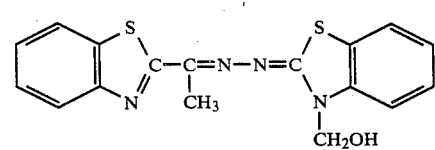

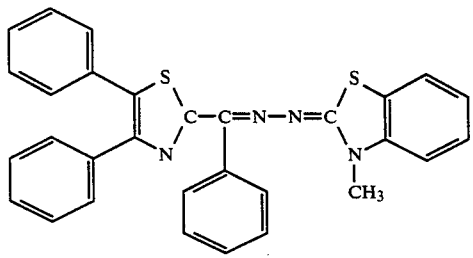
CT-(40)
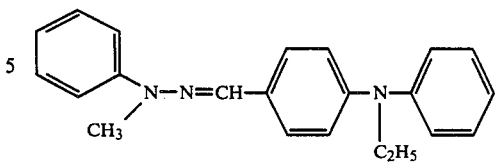
CT-(47)
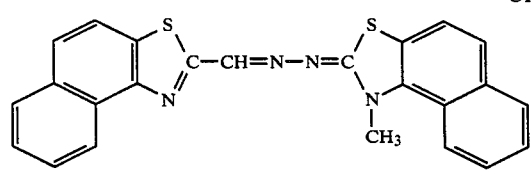
CT-(41)
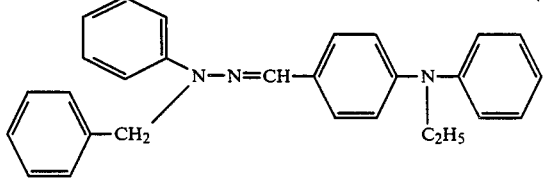
CT-(48)
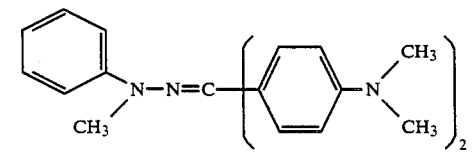
CT-(42)
CT-(49)
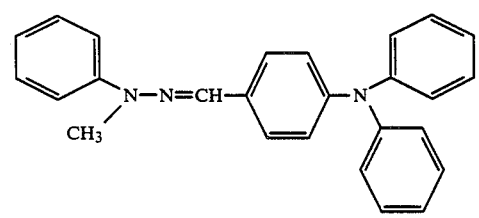
CT-(43)
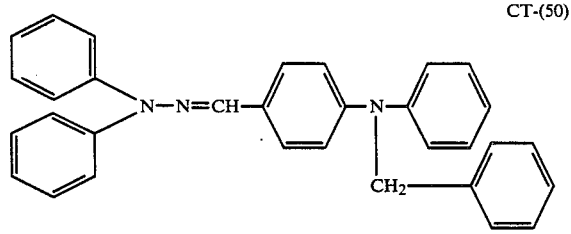
CT-(50)
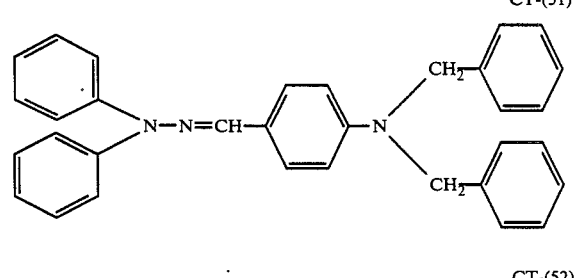
CT-(44)
CT-(51)
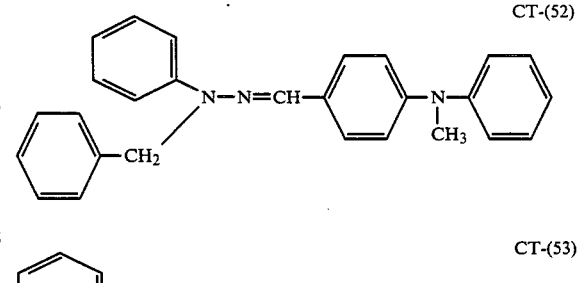
CT-(45)
CT-(52)
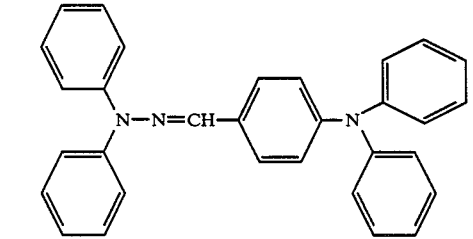
CT-(46)
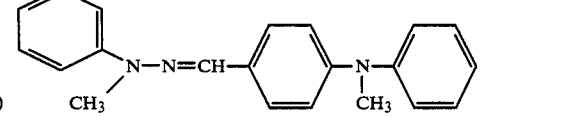
CT-(53)
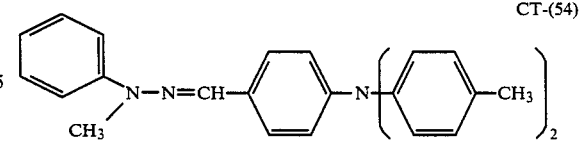
CT-(54)

-continued

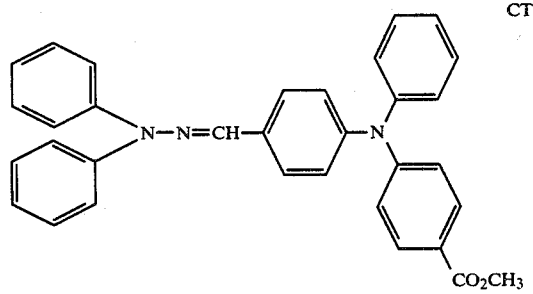
CT-(55)

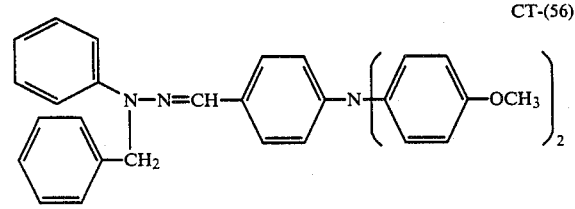
CT-(56)

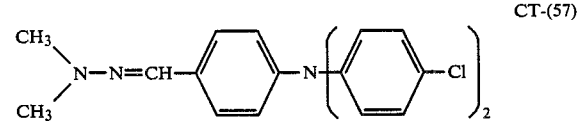
CT-(57)

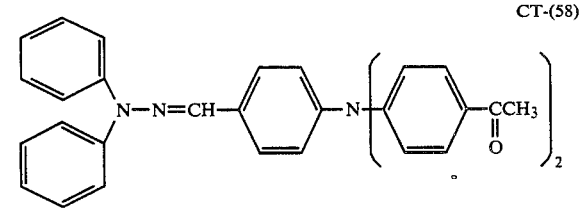
CT-(58)

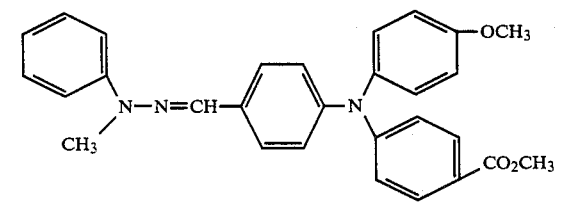
CT-(59)

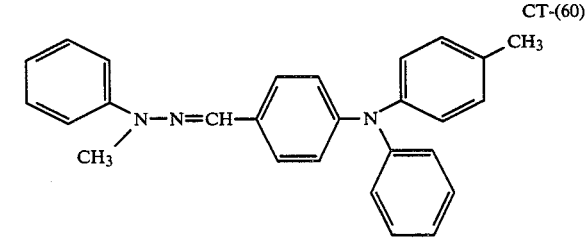
CT-(60)

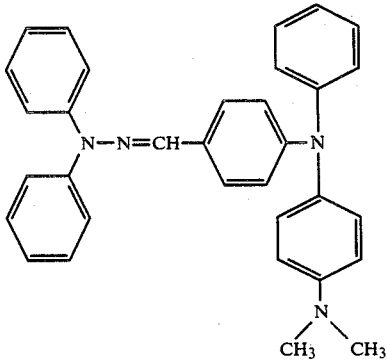
CT-(61)

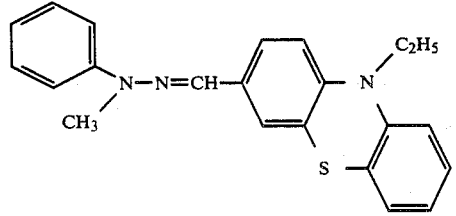
CT-(62)

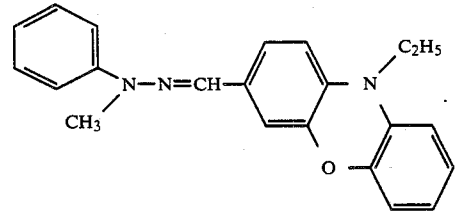
CT-(63)

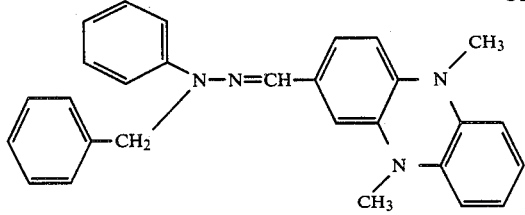
CT-(64)

The styryl dye of the present invention is used in such amount that the charge transporting substance is sensitized with the dye. The amount varies depending upon the kind of the organic photoconductor and the kind of the dye, but, as a general guide, the styryl dye is used in an amount of from about 0.01 part by weight to about 100 parts by weight, and preferably from about 0.1 part by weight to about 30 parts by weight, per 100 parts by weight of the charge transporting compound.

With high molecular charge transporting compounds, they themselves can form a film, but with low molecular compounds, a film-forming component is preferably added as a binder. Specific examples of the component include polycondensation type resins such as polyamides, polyurethanes, polyesters, epoxy resins, polyketones, polycarbonates, etc., and vinyl polymers such as polyvinylketones, polystyrene, poly-N-vinylcarbazole, polyacrylamides, etc. Any resin that is insulating and adhesive can be used. The binder is used in an amount of preferably 20 to 600 parts by weight, more preferably 50 to 400 parts by weight, per 100 parts by weight of charge transporting compound.

With the high molecular compounds, too, cyanoethylcellulose, nitrile rubber, bisphenol A polycarbonate, linear polyester, styrene/butadiene copolymer, vinylidene chloride/acrylonitrile copolymer, etc., may be used as reinforcing materials.

Plasticizers that can be used include biphenyl, biphenyl chloride, o-terphenyl, p-terphenyl, dibutyl phthalate, dimethylglycol phthalate, dioctyl phthalate, triphenyl phosphate, methylnaphthalene, benzophenone, chlorinated paraffin, polypropylene, polystyrene, dilaurylthiodipropionate, 3,5-dinitrosalicyclic acid, various fluorohydrocarbons, etc.

As additives for improving sensitivity, compounds as described in Japanese Patent Application (OPI) Nos. 65439/83, 102239/83, and 102240/83 may also be used.

The photoconductive composition in accordance with the present invention can be prepared by dispersing or dissolving the aforementioned two components, and, if necessary, other additional components in desired proportions to thereby prepare a dispersion or a uniform solution, applying the resulting dispersion or solution to a proper support, and removing the common solvent (by, for example, evaporation). For some purposes, the dispersion or solution of the photoconductive composition may be used as such without completely removing the solvent. The electrophotographic light-sensitive layer of the present invention is generally used by coating the thus obtained solution of the photoconductive composition on a support having a proper conductive surface and drying the coating to form a photoconductive layer. For some uses, an adhesive layer or the like may be provided.

As the solvent or dispersing medium to be used in preparing the coating solution, those which can dissolve or disperse the charge transporting compound, the styryl dye, and optionally added components in common are used, e.g., selected from benzene, toluene, xylene, chlorobenzene, dichloromethane, dichloroethane, trichloroethane, cyclohexanone, tetrahydrofuran, dioxane, etc., and the mixtures thereof.

The photoconductive composition of the present invention is coated to form a layer a dry thickness of from 1 to 30 μm, and preferably from 3 to 15 μm, on a support.

As the support with a conductive surface to be used in the present invention, any support that has electroconductivity at least on the surface thereof may be used. Specific examples thereof include a drum or sheet of metal such as aluminum, copper, iron or zinc, and paper, plastics or glass plates whose surface has been rendered conductive by depositing a metal such as aluminum, copper, zinc or indium, by depositing a conductive metal compound (e.g., $In_2O_3$ or $SnO_2$), by laminating a metal foil, or by coating a dispersion of carbon black, powder of a conductive metal compound (e.g., $In_2O_3$ or $SnO_2$) or a metal powder dispersed in a binder polymer. Preferably, plastic films that have been rendered conductive are used for transparent electrophotographic films.

The photoconductive composition of the present invention also gives an image according to the electrophoretic image photographic process described in U.S. Pat. Nos. 3,384,565 (Japanese Patent Publication No. 21781/68), 3,384,488 (Japanese Patent Publication No. 37125/72), 3,510,419 (Japanese Patent Publication No. 36079/71), etc., by atomizing the composition and dispersing the atomized particles in an insulating solvent.

The present invention is now illustrated in greater detail by reference to the following examples, which, however, are not to be construed as limiting the present invention in any way.

EXAMPLE 1

0.5 g of one of the charge transporting agent given in Table 1, $10^{-5}$ mole of one of the styryl dyes described in Table 1, and 1 g of a polycarbonate (trademark: Lexane 121; made by G.E. Co.) or a linear polyester resin (trademark: Vylon; made by Toyo Boseki Co., Ltd.) were dissolved in 5 g of dichloromethane to prepare a light-sensitive solution.

In this situation, a chemically sensitizing agent

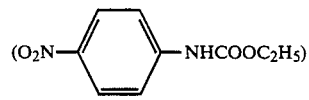

and/or a reinforcing agent (trademark: Stafix; made by Fuji Photo Film Co., Ltd.) were optionally added as other additives. Thus, 30 kinds of light-sensitive solutions were prepared.

Each of the thus obtained light-sensitive solutions was coated on a 100-μm thick polyethylene terephthalate film having deposited thereon an indium oxide film, and dried using a wire bar to thereby form a 8-μm thick photoconductive layer (electrophotographic light-sensitive layer). Thus, 30 electrophotographic films were prepared.

Then, the resulting electrophotographic films were corona charged at +7.5 KV in a static manner using a copying paper tester, SP-428 (made by Kawaguchi Denki Co., Ltd.), followed by exposure with an illuminance of 4 Lux to examine charging properties.

The charge-retaining properties were evaluated by measuring the electric potential after leaving the samples in a dark room for 60 seconds from the corona charging to thereby determine residual potential ratio (%) based on the initial potential.

In order to evaluate sensitivity, the exposure amounts which were sufficient to dissipate the unexposed potential to 1/2 ($E_{50}$) and 1/10 ($E_{90}$) respectively were determined.

The results thus obtained are shown in Table 1.

TABLE 1

| Electrophotographic Film No. | Styryl Dye | Charge Transport Agent | Binder | Other Additive(s) (g) | Charge-retaining Ability (%) | $E_{50}$ (Lux-sec) | $E_{90}$ (Lux-sec) |
| --- | --- | --- | --- | --- | --- | --- | --- |
| 1 | (1) | CT-(46) | Polycarbonate | — | 85 | 20 | 111 |
| 2 | (5) | " | " | — | 86 | 22 | 130 |
| 3 | (10) | " | " | — | 86 | 25 | 138 |
| 4 | (25) | " | " | — | 84 | 20 | 113 |
| 5 | (26) | " | " | — | 84 | 19 | 116 |
| 6 | (4) | " | " | (1) 0.01 | 83 | 50 | 337 |
| 7 | " | " | " | (1) 0.05 | 82 | 32 | 142 |

TABLE 1-continued

| Electro-photographic Film No. | Styryl Dye | Charge Transport Agent | Binder | Other Additive(s) (g) | Charge-retaining Ability (%) | $E_{50}$ (Lux-sec) | $E_{90}$ (Lux-sec) |
|---|---|---|---|---|---|---|---|
| 8 | " | " | " | (1) 0.05 (2) 0.1 | 80 | 92 | 436 |
| 9 | " | " | Polyester Resin | (1) 0.05 | 86 | 26 | 147 |
| 10 | " | " | " | — | 86 | 38 | 226 |
| 11 | (1) | CT-(43) | Polycarbonate | — | 82 | 48 | 396 |
| 12 | " | CT-(13) | " | — | 83 | 83 | 598 |
| 13 | " | CT-(38) | " | — | 80 | 130 | 924 |
| 14 | " | CT-(42) | " | — | 80 | 85 | 635 |
| 15 | " | CT-(27) | " | — | 85 | 58 | 410 |
| 16 | " | CT-(1) | " | — | 86 | 63 | 380 |
| 17 | " | CT-(43) | " | — | 88 | 74 | 530 |
| 18 | (4) | CT-(46) | " | — | 86 | 62 | 412 |
| 19 | (27) | " | " | — | 85 | 56 | 386 |
| 20 | (28) | " | " | — | 87 | 65 | 442 |
| 21 | (29) | " | " | — | 87 | 76 | 563 |
| 22 | (30) | " | " | — | 83 | 58 | 397 |
| 23 | (31) | " | " | — | 85 | 63 | 434 |
| 24 | (32) | " | " | — | 84 | 57 | 381 |
| 25 | (33) | " | " | — | 85 | 59 | 403 |
| 26 | (34) | " | " | — | 83 | 25 | 129 |
| 27 | (1) | CT-(51) | " | — | 84 | 24 | 115 |
| 28 | " | CT-(50) | " | — | 85 | 21 | 117 |
| 29 | " | CT-(44) | " | — | 85 | 22 | 130 |
| 30 | " | CT-(45) | " | — | 84 | 26 | 140 |

(Explanation for Table 1)

Styryl dye: designated in terms of the numbers of the specific compounds illustrated hereinbefore Charge transporting agent: designated in terms of the numbers of the specific compounds having been illustrated hereinbefore Other additives:
(1) designates a chemically sensitizing agent

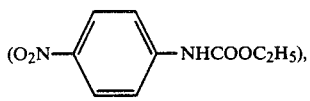

$(O_2N-\phantom{xxx}-NHCOOC_2H_5)$, and
(2) a reinforcing agent (trade name Stafix; made by Fuji Photo Film Co., Ltd.)

Sample Nos. 1 to 30 have a high transparency, a high charge retaining property and low $E_{50}$ value and $E_{90}$ value to form a suitable electrophotographic film.

EXAMPLE 2

0.2 g of vinylidene chloride/acrylonitrile resin (trademark: Saran R202; made by Asahi Chemical Industry Co., Ltd.) and 0.8 g of polycarbonate were dissolved in a mixed solvent of 26 g of dichloromethane and 7 g of chlorobenzene to prepare a coating solution for providing an adhesive layer.

Then, this coating solution was coated on a 100-μm thick polyethylene terephthalate film having a deposited indium oxide film and dried to form a 0.1- to 0.3-μm thick adhesive layer.

Further, each of the same photoconductive layers as those of electrophotographic film Nos. 1 to 10 in Example 1 were formed on the adhesive layer to prepare electrophotographic film Nos. 31 to 40.

Charging properties of ten kinds of electrophotographic films thus obtained were evaluated in the same manner as in Example 1 to obtain the results given in Table 2.

TABLE 2

| Electro-photographic Film No. | Composition of Photoconductive Layer | Charge-retaining Ability (%) | $E_{50}$ (Lux-sec) | $E_{90}$ (Lux-sec) |
|---|---|---|---|---|
| 31 | Same as with electrophotographic film No. 1 of Example 1 | 86 | 21 | 113 |
| 32 | Same as with electrophotographic film No. 2 of Example 1 | 86 | 22 | 131 |
| 33 | Same as with electrophotographic film No. 3 of Example 1 | 87 | 25 | 135 |
| 34 | Same as with electrophotographic film No. 4 of Example 1 | 84 | 22 | 120 |
| 35 | Same as with electrophotographic film No. 5 of Example 1 | 83 | 18 | 117 |
| 36 | Same as with electrophotographic film No. 6 of Example 1 | 83 | 50 | 340 |
| 37 | Same as with electrophotographic film No. 7 of Example 1 | 82 | 30 | 136 |
| 38 | Same as with electrophotographic film No. 8 of Example 1 | 80 | 95 | 450 |
| 39 | Same as with electrophotographic film No. 9 of Example 1 | 86 | 25 | 144 |
| 40 | Same as with electrophotographic film No. 10 of Example 1 | 87 | 39 | 231 |

The electrophotographic film Sample Nos. 31 to 40 having the adhesive layer between the support and the photoconductive layer show higher transparency and charge-retaining property, and $E_{50}$ value and $E_{90}$ value thereof are low to form a suitable electrophotographic film.

While the invention has been described in detail and with reference to specific embodiment thereof, it will be apparent to one skilled in the art that various changes and modifications can be made therein without departing from the spirit and scope thereof.

What is claimed is:

1. An electrophotographic light-sensitive material comprising a charge transporting compound and a styryl dye represented by formula (I)

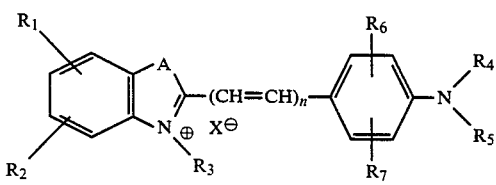

wherein

A represents N—$R_8$, O, S, Se, or

$R_1$ and $R_2$ each represents a hydrogen atom or a substituent having a Hammett's substituent constant, δ, of 0.2 or more;

$R_3$, $R_6$, $R_7$, $R_8$, $R_9$, and $R_{10}$ each represents a hydrogen atom, an alkyl group or a substituted alkyl group containing from 1 to 5 carbon atoms in the alkyl moiety;

$R_4$ and $R_5$ each represents a hydrogen atom, an alkyl group, a substituted alkyl group, an aryl group, or a substituted aryl group;

$X^\ominus$ represents an anion; and n represents an integer of 1 or 2.

2. An electrophotographic light-sensitive material as in claim 1, wherein the alkyl group and the substituted alkyl group represented by $R_4$ and $R_5$ each contain from 1 to 8 carbon atoms.

3. An electrophotographic light-sensitive material as in claim 1, wherein $R_1$ and $R_2$ each represents a member selected from the group consisting of hydrogen atom, a chlorine atom, a bromine atom, a nitro group, a cyano group, a trifluoromethyl group, a $CF_3$ group, a $CH_3CO$ group, or a $C_2H_5COO$ group;

$R_4$ and $R_5$ each represents a hydrogen atom, an alkyl group, a substituted alkyl group, an aryl group, or a substituted aryl group, wherein the substituent for the substituted alkyl or substituted aryl groups are selected from the group consisting of an alkyl group, an alkoxy group, and aryloxy group, an aryl group, a cyano group, a nitro group, a chlorine atom, or a bromine atom;

$X^\ominus$ represents an anion selected from the group consisting of $Cl^\ominus$, $Br^\ominus$, $I^\ominus$, $ClO_4^\ominus$, $BF_4^\ominus$, $ZnCl_3^\ominus$, $CF_3SO_3^\ominus$, or

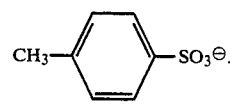

4. An electrophotographic light-sensitive material as in claim 1, wherein said styryl dye is used in an amount of from 0.01 part by weight to about 100 parts by weight per 100 parts by weight of the charge transporting compound.

5. An electrophotographic light-sensitive material as in claim 3, wherein said styryl dye is used in an amount of from 0.01 part by weight to about 100 parts by weight per 100 parts by weight of the charge transporting compound.

6. An electrophotographic light-sensitive material as in claim 1, wherein said styryl dye is used in an amount of from 0.1 part by weight to about 30 parts by weight per 100 parts by weight of the charge transporting compound.

7. An electrophotographic light-sensitive material as in claim 3, wherein said styryl dye is used in an amount of from 0.1 part by weight to about 30 parts by weight per 100 parts by weight of the charge transporting compound.

8. An electrophotographic light-sensitive material as in claim 1, wherein the charge transporting compound and the styryl dye are incorporated in a photoconductive composition layer having a dry thickness of from 1 to 30 μm.

9. An electrophotographic light-sensitive material as in claim 1, wherein the charge transporting compound is a hydrazone compound represented by formulae (II) and (III)

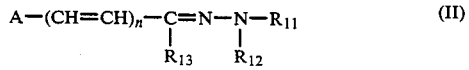

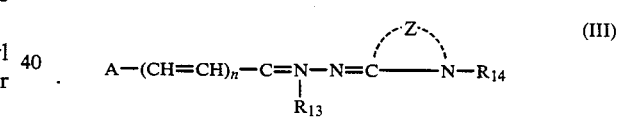

wherein

A represents an aryl group, a substituted aryl group, a heterocyclic group, or a substituted heterocyclic group, $R_{13}$ represents a hydrogen atom, an aryl group, a substituted aryl group, an alkyl group, a substituted alkyl group, an aralkyl group, or a substituted aralkyl group, $R_{11}$, $R_{12}$ and $R_{14}$ represent an alkyl group, an aryl group, a substituted aryl group, an aralkyl group or a substituted aralkyl group, n represents an integer of 0 or 1 and Z represents atoms forming a substituted or unsubstituted heterocyclic group.

10. An electrophotographic light-sensitive material as in claim 1, wherein the light-sensitive material contains a binder.

11. An electrophotographic light-sensitive material as in claim 10, wherein the binder is a polycondensation type resins or vinyl polymers.

12. An electrophotographic light-sensitive material as in claim 10, wherein the binder is used in an amount of 20 to 600 parts by weight per 100 parts by weight of the charge transporting compound.

13. An electrophotographic light-sensitive material as in claim 12, wherein the binder is used in an amount of 50 to 400 parts by weight per 100 parts by weight of the charge transporting compound.

* * * * *